United States Patent
Oguni et al.

(10) Patent No.: US 10,644,315 B2
(45) Date of Patent: May 5, 2020

(54) SINGLE-LAYER AND MULTILAYER GRAPHENE, METHOD OF MANUFACTURING THE SAME, OBJECT INCLUDING THE SAME, AND ELECTRIC DEVICE INCLUDING THE SAME

(75) Inventors: Teppei Oguni, Kanagawa (JP); Takeshi Osada, Kanagawa (JP); Toshihiko Takeuchi, Kanagawa (JP); Kuniharu Nomoto, Saitama (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 515 days.

(21) Appl. No.: 13/483,297

(22) Filed: May 30, 2012

(65) Prior Publication Data

US 2012/0308884 A1 Dec. 6, 2012

(30) Foreign Application Priority Data

Jun. 3, 2011 (JP) ................................ 2011-124952
Jun. 3, 2011 (JP) ................................ 2011-125027

(51) Int. Cl.
*B32B 3/00* (2006.01)
*C25D 13/12* (2006.01)
(Continued)

(52) U.S. Cl.
CPC ............ *H01M 4/587* (2013.01); *B82Y 30/00* (2013.01); *B82Y 40/00* (2013.01); *C25D 5/48* (2013.01);
(Continued)

(58) Field of Classification Search
CPC ....... H01M 10/0525; H01M 2004/027; H01M 4/0416; H01M 4/0452; H01M 4/13;
(Continued)

(56) References Cited

U.S. PATENT DOCUMENTS 4,628,015 A 12/1986 Yata et al.
6,685,804 B1 2/2004 Ikeda et al.
(Continued)

FOREIGN PATENT DOCUMENTS

CN 101563801 A 10/2009
CN 101572327 A 11/2009
(Continued)

OTHER PUBLICATIONS

Yonezawa et al., "Fabrication of Graphene Oxide Membrane by Electrophoretic Deposition", Proceedings of the 57th Spring Meeting, The Japan Society of Applied Physics and Related Societies, Mar. 17, 2010, pp. 17-040.
(Continued)

*Primary Examiner* — Lingwen R Zeng
(74) *Attorney, Agent, or Firm* — Nixon Peabody LLP; Jeffrey L. Costellia

(57) ABSTRACT

Graphene is formed with a practically uniform thickness on an uneven object. The object is immersed in a graphene oxide solution, and then taken out of the solution and dried; alternatively, the object and an electrode are immersed therein and voltage is applied between the electrode and the object used as an anode. Graphene oxide is negatively charged, and thus is drawn to and deposited on a surface of the object, with a practically uniform thickness. After that, the object is heated in vacuum or a reducing atmosphere, so that the graphene oxide is reduced to be graphene. In this manner, a graphene layer with a practically uniform thickness can be formed even on a surface of the uneven object.

19 Claims, 8 Drawing Sheets

(51) Int. Cl.
| | |
|---|---|
| *H01M 4/13* | (2010.01) |
| *C25D 13/00* | (2006.01) |
| *B82Y 40/00* | (2011.01) |
| *B82Y 30/00* | (2011.01) |
| *H01M 4/587* | (2010.01) |
| *H01M 4/1393* | (2010.01) |
| *H01M 4/04* | (2006.01) |
| *H01M 4/66* | (2006.01) |
| *H01M 4/70* | (2006.01) |
| *C25D 13/02* | (2006.01) |
| *C25D 5/48* | (2006.01) |
| *C25D 5/50* | (2006.01) |
| *H01M 4/133* | (2010.01) |

(52) U.S. Cl.
CPC ............... *C25D 5/50* (2013.01); *C25D 13/02* (2013.01); *C25D 13/12* (2013.01); *H01M 4/0452* (2013.01); *H01M 4/0471* (2013.01); *H01M 4/133* (2013.01); *H01M 4/1393* (2013.01); *H01M 4/66* (2013.01); *H01M 4/70* (2013.01); *Y10T 428/24355* (2015.01)

(58) Field of Classification Search
CPC ...... H01M 4/133; H01M 4/134; H01M 4/139; H01M 4/1393; H01M 4/1395; H01M 4/366; H01M 4/587; H01M 4/0471; H01M 4/66; H01M 4/70; B82Y 30/00; B82Y 40/00; C25D 13/02; C25D 13/12; C25D 5/48; C25D 5/50; Y02E 60/122; Y10T 428/24355; Y02P 70/54
USPC ................ 429/211, 312.8; 204/491
See application file for complete search history.

(56) References Cited

U.S. PATENT DOCUMENTS

| | | | |
|---|---|---|---|
| 6,887,511 | B1 | 5/2005 | Shima et al. |
| 7,179,561 | B2 | 2/2007 | Niu et al. |
| 7,192,673 | B1 | 3/2007 | Ikeda et al. |
| 7,195,842 | B1 | 3/2007 | Fujimoto et al. |
| 7,235,330 | B1 | 6/2007 | Fujimoto et al. |
| 7,241,533 | B1 | 7/2007 | Ikeda et al. |
| 7,410,728 | B1 | 8/2008 | Fujimoto et al. |
| 7,745,047 | B2 | 6/2010 | Zhamu et al. |
| 7,794,881 | B1 | 9/2010 | Fujimoto et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,003,257 | B2 | 8/2011 | Takeuchi et al. |
| 8,164,089 | B2 | 4/2012 | Wu et al. |
| 8,206,569 | B2 | 6/2012 | Lopatin et al. |
| 8,227,685 | B2 | 7/2012 | Choi |
| 8,257,866 | B2 | 9/2012 | Loveness et al. |
| 8,278,011 | B2 | 10/2012 | Zhu et al. |
| 8,357,475 | B2 | 1/2013 | Niu et al. |
| 8,440,369 | B2 | 5/2013 | Niu et al. |
| 8,450,012 | B2 | 5/2013 | Cui et al. |
| 8,486,562 | B2 | 7/2013 | Lopatin et al. |
| 8,507,135 | B2 | 8/2013 | Grupp et al. |
| 8,556,996 | B2 | 10/2013 | Loveness et al. |
| 9,045,346 | B2 | 6/2015 | Nesper et al. |
| RE45,703 | E | 9/2015 | Zhu et al. |
| 9,172,088 | B2 | 10/2015 | Loveness et al. |
| 9,172,094 | B2 | 10/2015 | Loveness et al. |
| 9,231,243 | B2 | 1/2016 | Cui et al. |
| 9,548,494 | B2 | 1/2017 | Nesper et al. |
| 9,776,378 | B2 | 10/2017 | Choi |
| 2002/0192554 | A1 | 12/2002 | Woo et al. |
| 2007/0131915 | A1 | 6/2007 | Stankovich et al. |
| 2008/0220329 | A1 | 9/2008 | Kojima et al. |
| 2008/0254296 | A1 | 10/2008 | Handa et al. |
| 2009/0110627 | A1 | 4/2009 | Choi et al. |
| 2009/0117467 | A1 | 5/2009 | Zhamu et al. |
| 2009/0123850 | A1 | 5/2009 | Takeuchi et al. |
| 2010/0021819 | A1 | 1/2010 | Zhamu et al. |
| 2010/0035093 | A1* | 2/2010 | Ruoff ................ H01M 4/926 429/493 |
| 2010/0078591 | A1 | 4/2010 | Sano et al. |
| 2010/0081057 | A1 | 4/2010 | Liu et al. |
| 2010/0143798 | A1 | 6/2010 | Zhamu et al. |
| 2010/0176337 | A1 | 7/2010 | Zhamu et al. |
| 2010/0203391 | A1 | 8/2010 | Lopatin et al. |
| 2010/0233538 | A1 | 9/2010 | Nesper et al. |
| 2010/0233546 | A1 | 9/2010 | Nesper et al. |
| 2010/0248034 | A1 | 9/2010 | Oki et al. |
| 2010/0266898 | A1 | 10/2010 | Yamamoto et al. |
| 2010/0285358 | A1* | 11/2010 | Cui ................ H01M 4/134 429/218.1 |
| 2010/0291438 | A1 | 11/2010 | Ahn et al. |
| 2010/0308277 | A1 | 12/2010 | Grupp |
| 2010/0330419 | A1 | 12/2010 | Cui et al. |
| 2010/0330421 | A1 | 12/2010 | Cui et al. |
| 2011/0012067 | A1 | 1/2011 | Kay |
| 2011/0020706 | A1 | 1/2011 | Nesper |
| 2011/0070146 | A1 | 3/2011 | Song et al. |
| 2011/0111277 | A1 | 5/2011 | Bessho et al. |
| 2011/0111299 | A1 | 5/2011 | Liu et al. |
| 2011/0111303 | A1* | 5/2011 | Kung et al. ............... 429/231.8 |
| 2011/0121240 | A1 | 5/2011 | Amine et al. |
| 2011/0133131 | A1 | 6/2011 | Zhou et al. |
| 2011/0159372 | A1 | 6/2011 | Zhamu et al. |
| 2011/0183203 | A1 | 7/2011 | Du et al. |
| 2011/0227000 | A1* | 9/2011 | Ruoff et al. ............... 252/502 |
| 2011/0229761 | A1 | 9/2011 | Cui et al. |
| 2011/0229795 | A1 | 9/2011 | Niu et al. |
| 2011/0266654 | A1 | 11/2011 | Kuriki et al. |
| 2011/0269016 | A1 | 11/2011 | Takeuchi et al. |
| 2012/0058397 | A1 | 3/2012 | Zhamu et al. |
| 2012/0070741 | A1 | 3/2012 | Liu et al. |
| 2012/0088151 | A1 | 4/2012 | Yamazaki et al. |
| 2012/0088156 | A1 | 4/2012 | Nomoto et al. |
| 2012/0183856 | A1 | 7/2012 | Cui et al. |
| 2012/0237823 | A1 | 9/2012 | Lopatin et al. |
| 2016/0013483 | A1 | 1/2016 | Loveness et al. |
| 2016/0190600 | A1 | 6/2016 | Cui et al. |

FOREIGN PATENT DOCUMENTS

| | | | |
|---|---|---|---|
| CN | 101939867 | A | 1/2011 |
| CN | 102021633 | A | 4/2011 |
| CN | 102051651 | A | 5/2011 |
| CN | 102084525 | A | 6/2011 |
| EP | 1231651 | A | 8/2002 |
| EP | 1231653 | A | 8/2002 |
| EP | 1231654 | A | 8/2002 |
| EP | 1237210 | A | 9/2002 |
| EP | 1244163 | A | 9/2002 |
| EP | 1244164 | A | 9/2002 |
| EP | 1246278 | A | 10/2002 |
| EP | 1903628 | A | 3/2008 |
| EP | 2237346 | A | 10/2010 |
| EP | 2256087 | A | 12/2010 |
| EP | 2287946 | A | 2/2011 |
| EP | 2 309 573 | A1 | 4/2011 |
| EP | 2378597 | A | 10/2011 |
| EP | 2432058 | A | 3/2012 |
| JP | 2002-063894 | | 2/2002 |
| JP | 2002-083594 | A | 3/2002 |
| JP | 2003-176117 | A | 6/2003 |
| JP | 2004-323345 | A | 11/2004 |
| JP | 2006-265751 | | 10/2006 |
| JP | 2008-016792 | A | 1/2008 |
| JP | 2008-066053 | A | 3/2008 |
| JP | 2008-181751 | A | 8/2008 |
| JP | 2008-257894 | | 10/2008 |
| JP | 2009-524567 | | 7/2009 |
| JP | 2009-176721 | | 8/2009 |
| JP | 2010-129332 | | 6/2010 |
| JP | 2010-219047 | A | 9/2010 |
| JP | 2010-275186 | A | 12/2010 |

(56) References Cited

FOREIGN PATENT DOCUMENTS

| | | |
|---|---|---|
| JP | 2011-018575 A | 1/2011 |
| JP | 2011-503804 | 1/2011 |
| JP | 2011-029184 A | 2/2011 |
| JP | 2011-048992 | 3/2011 |
| JP | 2011-076931 A | 4/2011 |
| JP | 2011-082517 A | 4/2011 |
| JP | 2011-517053 | 5/2011 |
| JP | 2012-526364 | 10/2012 |
| JP | 2018-063957 A | 4/2018 |
| KR | 2010-0093965 A | 8/2010 |
| KR | 2011-0016287 A | 2/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO 2010-016545 A1 | 2/2010 |
| WO | WO-2010/090956 | 8/2010 |
| WO | WO-2010/129910 | 11/2010 |
| WO | WO-2010/138617 | 12/2010 |
| WO | WO-2010/138619 | 12/2010 |
| WO | WO-2011/109477 | 9/2011 |
| WO | WO-2011/119614 | 9/2011 |
| WO | WO-2011/149958 | 12/2011 |
| WO | WO-2012/054767 | 4/2012 |

OTHER PUBLICATIONS

Zhou.X et al., "Graphene modified LiFePO4 cathode materials for high power lithium ion batteries,", J. Mater. Chem. (Journal of Materials Chemistry), 2011, vol. 21, pp. 3353-3358.
Su.F et al., "Flexible and planar graphene conductive additives for lithium-ion batteries,", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors,", NANO Letters, 2011, vol. 11, No. 7, pp. 2905-2911.
Liu.S et al., ""Green" electrochemical synthesis of Pt/graphene sheet nanocomposite film and its electrocatalytic property", Journal of Power Sources, Aug. 1, 2010, vol. 195, No. 15, pp. 4628-4633.
Taiwanese Office Action (Application No. 101119124) dated Jul. 22, 2015.
Lee.V et al., "Large-Area Chemically Modified Graphene Films: Electrophoretic Deposition and Characterization by Soft X-ray Absorption Spectroscopy", Chem. Mater. (Chemistry of Materials), Jul. 16, 2009, vol. 21, No. 16, pp. 3905-3916, American Chemical Society.
Chinese Office Action (Application No. 201210191843.5) dated Jul. 29, 2015.
Taiwanese Office Action (Application No. 105113520) dated Oct. 3, 2016.
Taiwanese Office Action (Application No. 106105101) dated Mar. 9, 2018.
Graphene: Functions and Applications, Jul. 31, 2009, pp. 171-172, CMC Publishing Co., Ltd.

\* cited by examiner

SINGLE-LAYER AND MULTILAYER GRAPHENE, METHOD OF MANUFACTURING THE SAME, OBJECT INCLUDING THE SAME, AND ELECTRIC DEVICE INCLUDING THE SAME

BACKGROUND OF THE INVENTION

1. Field of the Invention

The present invention relates to single-layer graphene which is a one-atom-thick sheet of carbon molecules having $sp^2$ bonds, multilayer graphene in which 2 to 100 layers, preferably 2 to 50 layers, more preferably 2 to 20 layers of the single-layer graphene are stacked, a method of manufacturing the single-layer or multilayer graphene, and an electric device (power storage device) including the single-layer or multilayer graphene.

In this specification, single-layer graphene and multilayer graphene are simply collectively referred to as graphene (or graphene layer). When the number of layers of graphene is specified as x, the graphene is referred to as "x layers of graphene." Note that graphene is also two-dimensionally extended polyacene (see Patent Document 5).

2. Description of the Related Art

Graphene has excellent electrical characteristics such as high conductivity and high mobility and excellent physical characteristics such as flexibility and high mechanical strength, and thus has been tried to be applied to a variety of products (see Patent Documents 1 to 3).

REFERENCE

[Patent Document 1] United States Patent Application Publication No. 2011/0070146
[Patent Document 2] United States Patent Application Publication No. 2009/0110627
[Patent Document 3] United States Patent Application Publication No. 2007/0131915
[Patent Document 4] United States Patent Application Publication No. 2010/0081057
[Patent Document 5] U.S. Pat. No. 4,628,015

SUMMARY OF THE INVENTION

A chemical vapor deposition (CVD) method and a coating method are main manufacturing methods of graphene. In the CVD method, for example, as described in Patent Document 1 or Patent Document 2, a metal serving as a catalyst is heated and a hydrocarbon gas is supplied to the metal, so that graphene is grown on the catalyst.

In the coating method, as described in Patent Document 3, graphene oxide, which is obtained by oxidizing graphite, is dispersed in a solution, a graphene oxide film is formed by application of the solution, and then the graphene oxide is reduced to obtain graphene.

Graphene can be formed on a flat surface by either method. However, it is difficult to form graphene on a complex curved surface or an uneven object. An object of one embodiment of the present invention is to provide graphene formed on a complex curved surface or an uneven object. Another object of one embodiment of the present invention is to provide a method of forming graphene on a complex curved surface or an uneven object. Another object of one embodiment of the present invention is to provide a device including graphene formed on a complex curved surface or an uneven object.

Another object of one embodiment of the present invention is to provide an electric device, particularly a cathode material or a power storage device with high capacity and less deterioration due to charging and discharging, including a graphene layer over an uneven object. Another object of one embodiment of the present invention is to provide a cathode material or a power storage device suitable for high-speed charging or extraction of high power. One embodiment of the present invention achieves at least one of the objects.

One embodiment of the present invention is a method of forming a graphene layer including the steps of: immersing an object with an uneven surface in a solution in which graphene oxide is dispersed; taking the object out of the solution; drying the surface of the object to form a graphene oxide layer on the surface; and performing heat treatment to reduce the graphene oxide to form a graphene layer on the surface of the object.

Another embodiment of the present invention is a method of forming a graphene layer including the steps of: immersing an object with an uneven and electrically conductive surface in a solution in which graphene oxide is dispersed to form a graphene oxide layer on the surface of the object by an electrophoresis method using the object as an anode; and performing heat treatment to reduce the graphene oxide to form a graphene layer on the surface of the object.

The graphene oxide is negatively charged; thus, when the object on which graphene is to be formed is used as an anode, the graphene oxide in the solution moves to the surface of the object, so that a graphene oxide layer can be formed.

The graphene oxide is heated in an appropriate atmosphere such as vacuum or a reducing atmosphere to reduce the graphene oxide, so that the graphene layer can be formed on the surface of the object. Note that graphene is not necessarily pure carbon and the purity can be determined depending on the intended use. For example, the concentration of elements other than carbon and hydrogen may be lower than or equal to 15 atomic %, or the concentration of elements other than carbon may be lower than or equal to 30 atomic %. The length of one side of graphene oxide which is used may be less than or equal to 100 μm, preferably less than or equal to 10 μm.

In the above structure, over the graphene layer, a graphene oxide layer may be further formed and reduced to form another graphene layer.

Another embodiment of the present invention is an uneven object whose surface is provided with a graphene layer. The surface of the object (the surface is in contact with the graphene layer) may have conductivity. Another embodiment of the present invention is a whisker-like object whose surface is covered with a graphene layer.

Another embodiment of the present invention is an electric device including an object with unevenness which is covered with a graphene layer. Another embodiment of the present invention is a power storage device which includes a negative electrode current collector including whiskers covered with a graphene layer as a cathode. The graphene layer has at least one pore.

In the above structure, one or a plurality of layers formed of a material which is different from the graphene layer may be formed over the graphene layer. A graphene layer may be formed over a layer of a material which is different from the graphene layer. In that case, the layer of a material which is different from the graphene layer preferably has an effect of reducing stress so that the graphene layer is prevented from being separated.

According to one embodiment of the present invention, graphene can be formed with a practically uniform thickness even on an uneven object. The reason for this is as follows: in particular, in the case where a graphene oxide layer is formed on a surface of an object by an electrophoresis method, graphene oxide is hardly stacked over a portion of the object, which is already covered with a graphene oxide layer, due to sufficiently low conductivity of graphene oxide, but the graphene oxide is stacked preferentially over a portion which is not yet covered with a graphene oxide layer. The graphene oxide is stacked as described above; thus, the thickness of the graphene oxide formed on the surface of the object is practically uniform.

Note that since part of an edge of a graphene sheet with a certain size in graphene oxide is terminated with a carboxyl group (—COOH), hydrogen ions detach from the carboxyl group in a solvent such as water and the graphene oxide itself is negatively charged. Thus, the graphene oxide is drawn to and deposited on an anode.

Even when an object whose surface is covered with a graphene layer with a practically uniform thickness is swelled for some reason, the object can be prevented from being crushed because of sufficient flexibility of the graphene.

One embodiment of the present invention can be applied to a variety of electric devices. For example, one embodiment of the present invention can be used as a cathode material for a lithium-ion secondary battery. In that case, a graphene layer not only protects a surface but also functions as an active material.

A graphite-based cathode material is widely used as a cathode material for a lithium-ion secondary battery. However, the graphite-based cathode material has a theoretical discharge capacity per unit mass of only 372 mAh/g because one lithium atom is assumed to be bonded to six carbon atoms.

Graphene is proposed to be used as a cathode material (see Patent Document 4). Graphene is two-dimensionally extended polyacene (see Patent Document 5). In polyacene, one lithium atom is bonded to two carbon atoms; thus, the discharge capacity of polyacene can be three times as high as that of graphite. Graphene similarly can keep lithium in high density and can have high discharge capacity.

Note that the above method makes it possible to form a graphene layer over, for example, a whisker-like negative electrode current collector or a negative electrode active material. As a result, the surface area of a cathode becomes very large; in that case, 1 to 50 layers of graphene, preferably 1 to 20 layers of graphene can be formed. The graphene has adequate pores or spaces, through which lithium ions can move in and out. Further, lithium ions can be accumulated in the graphene. In other words, the graphene can be used as a cathode material.

Further, the distance between graphene in the graphene layer is larger than that in graphite; thus, lithium ions can be accumulated in higher density. An increase in volume is limited even in a state where lithium ions are provided between graphene; thus, an active material is hardly divided finely even when charging and discharging are repeated. This enables the graphene to be a cathode material which withstands repeated charging and discharging.

Further, the large surface area is preferable for lithium ions to move in and out at high speed, and high-speed charging and extraction of high power become possible.

Note that the above effect can be obtained with only a graphene layer with low crystallinity. The effect cannot be sufficiently obtained with a graphene film with high crystallinity which is formed by, for example, a CVD method as in Patent Document 2 or Patent Document 3 due to a small number of pores and a short distance between graphenes.

The observation by the inventors shows that 65 layers of graphene and 108 layers of graphene are easily separated from whiskers which are a base and that the degree of the separation of the 108 layers of graphene was higher than that of the 65 layers of graphene. In contrast, separation was not observed in 17 layers of graphene and 43 layers of graphene.

In other words, 101 or more layers of graphene might be separated at the time of charging and discharging, and 50 or less layers of graphene are preferable for sufficiently suppressing separation. More flexible graphene is preferably used in order to prevent separation. Note that a graphene layer is not limited thereto as long as the adhesion between whiskers and graphene is high.

In order to obtain more flexible graphene, 20 or less layers of graphene may be used. The concentration of oxygen is preferably higher; the concentration of oxygen is preferably higher than or equal to 5 atomic % and lower than or equal to 15 atomic %. Such a graphene layer has a sufficiently large distance between the graphenes, and thus is preferably used, in which case lithium ions can be accumulated in high density. Note that in the case where the conductivity of a graphene layer is emphasized, the concentration of oxygen is preferably low; the concentration of oxygen is preferably lower than or equal to 1 atomic %.

DETAILED DESCRIPTION OF THE INVENTION

Embodiments of the present invention will be described below. Note that the embodiments can be implemented in various modes, and it is easily understood by those skilled in the art that modes and details can be modified in various ways without departing from the spirit and scope of the present invention. Therefore, the present invention should not be construed as being limited to the description of the embodiments below.

Embodiment 1

In this embodiment, a method of forming graphene on an object will be described. Graphene oxide is obtained in such a manner that graphite is oxidized to form graphite oxide and the graphite oxide is subjected to ultrasonic vibrations. Patent Document 3 may be referred to for the details. Alternatively, commercial graphene oxide may be used.

Graphene oxide is dispersed in a solvent such as water or N-methylpyrrolidone (NMP). The solvent is preferably a polar solvent. The graphene oxide may be contained at a concentration of 0.1 g to 10 g per liter.

Figure 1:
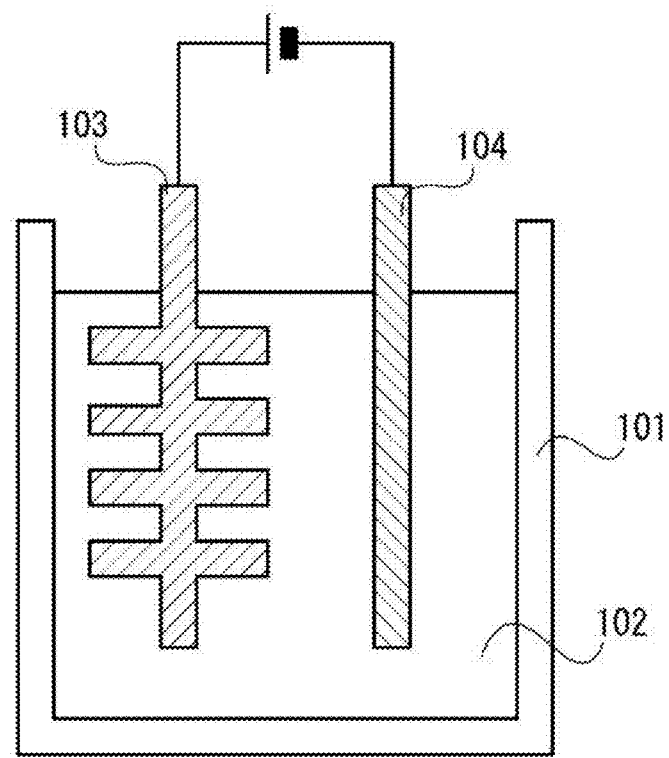
FIG. 1 illustrates an apparatus used in Embodiment 1.

FIG. 1 illustrates an apparatus used in this embodiment. A solution 102 in which graphene oxide is dispersed is put in a container 101, and an object 103 on which a graphene layer is to be formed is put therein and is used as an anode. In addition, a conductor 104 serving as a cathode is put in the solution, and appropriate voltage (e.g., 5 V to 20 V) is applied between the anode and the cathode. Note that the voltage is not necessarily constant. By measuring the amount of charge flowing between the anode and the cathode, the thickness of a graphene oxide layer deposited on the object can be estimated.

When graphene oxide with a required thickness is obtained, the object is taken out of the solution and dried. Furthermore, the object is heated at 150° C. or higher, preferably 200° C. or higher, in vacuum or a reducing atmosphere such as an inert gas (e.g., nitrogen or a rare gas) atmosphere. The higher the heating temperature is and the longer the heating time is, the higher the degree of reduction of graphene oxide can be and the higher the purity of graphene can be (i.e., the concentration of elements other than carbon can be low); however, the heating, temperature should be determined in consideration of the reactivity with the object. Note that it is known that graphene oxide is reduced at 150° C.

Note that the treatment is preferably performed at high temperatures in order to improve electron conductivity of graphene to be obtained. For example, although the resistivity of multilayer graphene is about 240 MΩcm at a heating temperature of 100° C. (1 hour), the resistivity is about 4 kΩcm at a heating temperature of 200° C. (1 hour) and is about 2.8 Ωcm at a heating temperature of 300° C. (1 hour) (each resistivity is an average value of 8 samples).

As described above, the graphene oxide formed on a surface of the object is reduced to be graphene. At this time, adjacent graphenes are bonded to form a larger net-like or sheet-like network. Even in the case where the object has depressions and projections, the graphene formed in such a manner has a substantially uniform thickness on the depressions and the projections.

Embodiment 2

In this embodiment, an example in which 1 to 50 layers of graphene are formed on surfaces of silicon whiskers formed on one surface of a negative electrode current collector of a lithium-ion secondary battery will be described. In this embodiment, graphene is formed by an immersion method.

First, graphite is oxidized to form graphite oxide, and the graphite oxide is subjected to ultrasonic vibrations to obtain graphene oxide. The graphene oxide is dispersed in a solvent such as water or NMP.

A current collector with a silicon active material layer including silicon whiskers is immersed in the solution, taken out of the solution, and then dried. In addition, the current collector is heated at 150° C. or higher, preferably 200° C. or higher, in vacuum or a reducing atmosphere such as an inert gas (e.g., nitrogen or a rare gas) atmosphere. Through the above steps, 1 to 50 layers of graphene can be formed on a surface of the silicon active material layer.

The current collector including the silicon whiskers whose surfaces are provided with the graphene layer may be, further subjected to treatment as described above, so that another graphene layer is formed to overlap with the graphene layer. This may be repeated three or more times. When multilayer graphene is formed in such a manner, graphene can have higher strength and can be prevented from being separated from the whiskers.

In the case where a thick graphene layer is formed through one step, the directions of sp² bonds in the graphene layer become random, and the strength of the graphene layer is not proportional to the thickness thereof. In contrast, in the case where the graphene layer is formed through several steps as described above, the directions of sp² bonds in the graphene layer are substantially parallel to surfaces of whiskers; thus, the thicker the graphene layer is, the higher the strength of the graphene layer is.

Further, in order to form a thick graphene layer, a layer of an appropriate material may be formed over a graphene layer, and another graphene layer may be formed over the layer of an appropriate material. As the material for the layer, a material which is flexible like copper and does not absorb lithium is preferably used.

Figure 2:
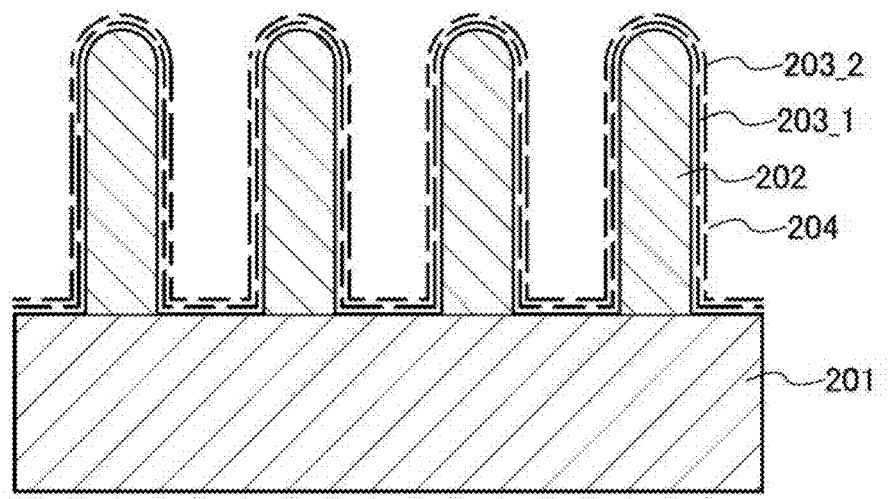
FIG. 2 is a view relating to one embodiment of the present invention.

FIG. 2 schematically illustrates the above current collector and whiskers, and a graphene layer. A surface of a current collector 201 is processed to be provided with whiskers 202. In addition, a first layer of graphene 203_1, a second layer of graphene 203_2, and the like are formed on surfaces of the whiskers 202 by the above treatment. A graphene layer 203 has adequate pores 204. In the case where the graphene layer 203 is formed through plural steps, the positions of the pores 204 do not overlap in some cases.

Note that the surface of the current collector 201 may be provided with a groove or a hole instead of the whiskers 202. In any case, there is no limitation to such structures as long as the surface area of the current collector 201 is increased. Structures such as the current collector 201 and the whiskers 202 may be formed using different materials. For example, the current collector 201 may be formed using titanium and the whiskers 202 may be formed using silicon by a CVD method.

Figure 3:
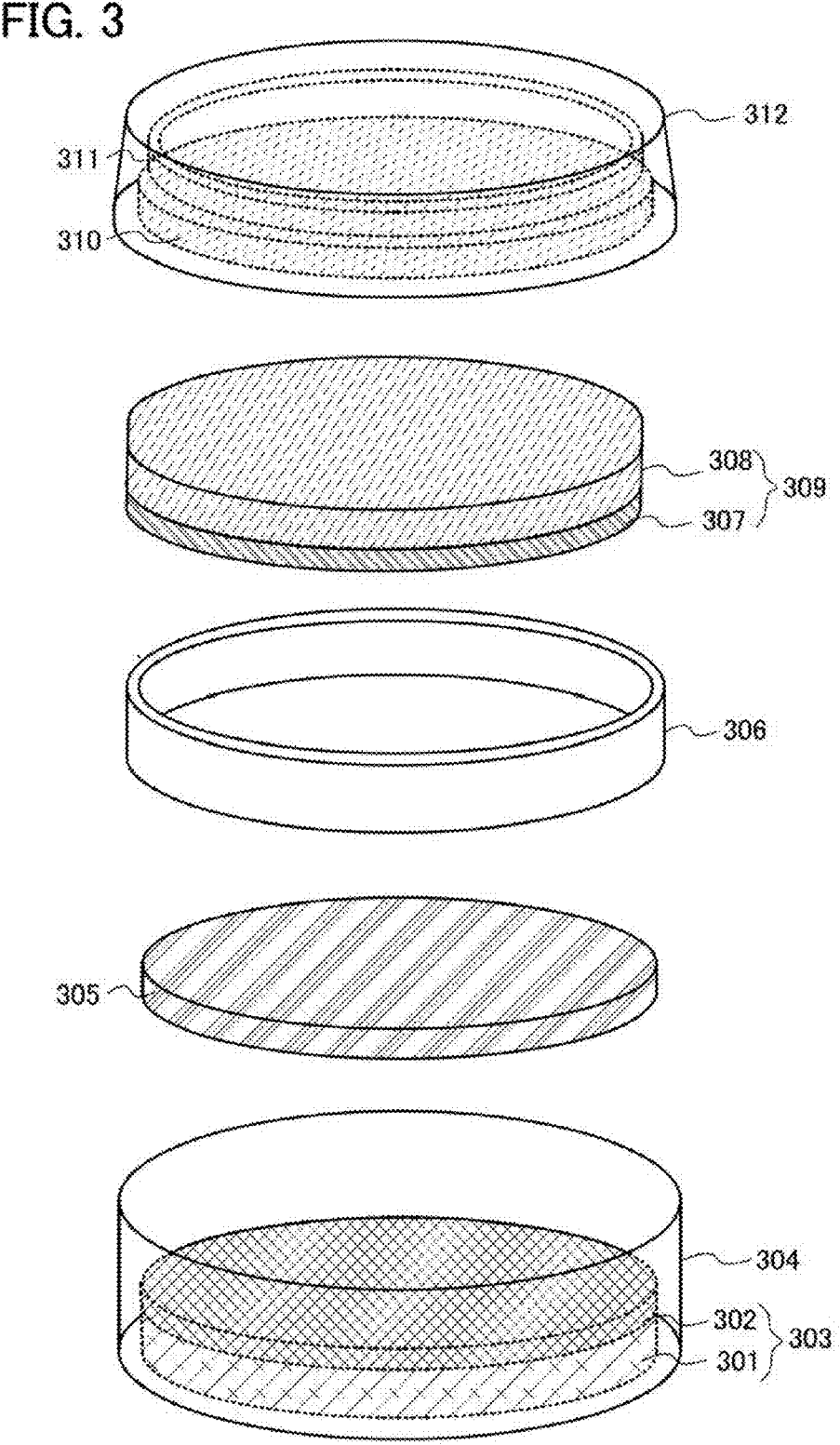
FIG. 3 is a view relating to one embodiment of the present invention.

FIG. 3 schematically illustrates a structure of a coin-type secondary battery. As illustrated in FIG. 3, the coin-type secondary battery includes a cathode 303, an anode 309, a separator 305, an electrolyte solution (not illustrated), a housing 304, and a housing 312. Besides, the coin-type secondary battery includes a ring-shaped insulator 306, a spacer 310, and a washer 311.

In the cathode 303, a negative electrode active material layer 302 provided with whiskers is formed over a negative electrode current-collector 301. As the negative electrode current collector 301, for example, copper or titanium is preferably used. After the negative electrode current collector 301 is immersed in the above-described graphene oxide solution, heat treatment is performed to reduce the graphene oxide, so that 1 to 50 layers of graphene are formed on surfaces of the whiskers.

This process is performed plural times to obtain a graphene layer with a total thickness of 30 nm to 300 nm. The graphene layer serves as a negative electrode active material. The graphene layer formed on the whiskers has a very-large surface area, and thus is suitable for high-speed charging or high-capacity discharging. Note that the graphene layer is very thin, and thus is not illustrated in FIG. 3.

As a material for a positive electrode current collector 307, aluminum is preferably used. A positive electrode active material layer 308 may be formed in such a manner that slurry in which positive electrode active material particles, a binder, and a conduction auxiliary agent are mixed is applied on the positive electrode current collector 307 and is dried.

As the positive electrode active material, lithium cobaltate, lithium iron phosphate, lithium manganese phosphate, lithium manganese silicate, lithium iron silicate, or the like can be used; however, one embodiment of the present invention is not limited thereto. The size of the active material particle is preferably 20 nm to 100 nm. Further, a carbohydrate such as glucose may be mixed at the time of baking of the positive electrode active material particles so that the positive electrode active material particles are coated with carbon. This treatment can improve the conductivity.

An electrolyte solution in which $LiPF_6$ is, dissolved in a mixed solvent of ethylene carbonate (EC) and diethyl carbonate (DEC) is preferably used; however, the present invention is not limited hereto.

An insulator with pores (e.g., polypropylene) may be used for the separator 305. Alternatively, a solid electrolyte which can transmit lithium ions may be used.

The housing 304, the housing 312, the spacer 310, and the washer 311 each of which is preferably made of metal (e.g., stainless steel). The housing 304 and the housing 312 have a function of electrically connecting the cathode 303 and the anode 309 to the outside.

The cathode 303, the anode 309, and the separator 305 are immersed in an electrolyte solution. Then, as illustrated in FIG. 3, the cathode 303, the separator 305, the ring-shaped insulator 306, the anode 309, the spacer 310, the washer 311, and the housing 312 are stacked in this order with the housing 304 positioned at the bottom. The housing 304 and the housing 312 are subjected to pressure bonding. In such a manner, the coin-type secondary battery is manufactured.

Embodiment 3

In this embodiment, another example of forming a graphene layer including 1 to 50 layers of graphene on surfaces of whiskers formed over a current-collector will be described. In this embodiment, graphene is formed by an electrophoresis method. As in Embodiment 2, graphene oxide is dispersed in a solvent such as water or NMP. The graphene oxide may have a concentration of 0.1 g to 10 g per liter.

A current collector provided with whiskers is put in a solution in which graphene oxide is dispersed and is used as an anode. A conductor serving as a cathode is also put in the solution, and appropriate voltage (e.g., 5 V to 20 V) is applied between the anode and the cathode. Since part of an edge of a graphene sheet with a certain size in graphene oxide is terminated with a carboxyl group (—COOH), hydrogen ions detach from the carboxyl group in a solvent such as water and the graphene oxide itself is negatively charged. Thus, the graphene oxide is drawn to and deposited on an anode. Note that the voltage in that case is not necessarily constant. By measuring the amount of charge flowing between the anode, and the cathode, the thickness of a graphene oxide layer deposited on the whiskers can be estimated.

When graphene oxide with a required thickness is obtained, the current collector is taken out of the solution and dried. In addition, the current collector is heated at 150° C. or higher, preferably 200° C. or higher, in vacuum or a reducing atmosphere such as an inert gas (e.g., nitrogen or a rare gas) atmosphere. As a result, the graphene oxide, formed on surfaces of the whiskers is reduced to be graphene. At this time, adjacent graphenes are bonded to form a larger net-like or sheet-like network.

The thus formed graphene has a substantially uniform thickness even on depressions and projections which are formed by the whiskers or the like. In such a manner, a graphene layer including 1 to 50 layers of graphene can be formed on a surface of a silicon active material layer.

After the graphene layer is formed in the above-described manner, the formation of a graphene layer by the method described in this embodiment or the formation of a graphene layer by the method described in Embodiment 2 is performed plural times to obtain a graphene layer with a total thickness of 30 nm to 300 nm. The graphene layer serves as a negative electrode active material. After that the process described in Embodiment 2 is performed. In such a manner, a secondary battery can be manufactured.

Embodiment 4

A power storage device of one embodiment of the present invention can be used in, for example, electric vehicles, electric power tools, personal computers, mobile phones, and the like. Such electric devices are not always supplied with power through wires, and thus are provided with storage batteries inside. As negative electrode active materials for the storage batteries, for example, silicon whose surface is covered with 1 to 50 layers of graphene, which is described in Embodiment 2 or Embodiment 3, may be used.

In particular, storage batteries with low internal resistance are needed for applications where a large amount of current needs to be fed momentarily or where a required current value varies greatly. Therefore, a sufficient effect can be obtained by using one embodiment of the present invention. Further, a storage battery with high electric capacity is needed for a moving object; a sufficient effect can be obtained by using one embodiment of the present invention.

Besides, the following are given as specific examples of electronic and electric devices: the power storage device according to one embodiment of the present invention, display devices, lighting devices, image reproduction devices which reproduce a still image or a moving image stored in a recording medium such as a digital versatile disc (DVD), high-frequency heating apparatus such as microwaves, electric rice cookers, electric washing machines, air-conditioning systems such as air conditioners, electric refrigerators, electric freezers, electric refrigerator-freezers, freezers for preserving DNA, dialysis devices, and the like.

In addition, moving objects driven by an electric motor using electric power from a power storage device are also included in the category of electronic and electric devices. As examples of the moving object, electric vehicles, hybrid vehicles which include both an internal-combustion engine and a motor, motorized bicycles including motor-assisted bicycles, and the like can be given.

In the electronic and electric devices, the power storage device according to one embodiment of the present invention can be used as a power storage device for supplying enough electric power for almost the whole power consumption (referred to as a main power supply). Further, in the electronic and electric devices, the power storage device according to one embodiment of the present invention can be used as a power storage device which can supply electric power to the electronic and electric devices when the supply of power from a commercial power supply is stopped (such a power storage device is referred to as an uninterruptible power supply).

Furthermore, in the electronic and electric devices, the power storage device according to one embodiment of the present invention can be used as a power storage device for supplying electric power to the electronic and electric devices at the same time as the electric power supply from the main power supply or a commercial power supply (such a power storage device is referred to as an auxiliary power supply).

Figure 4:
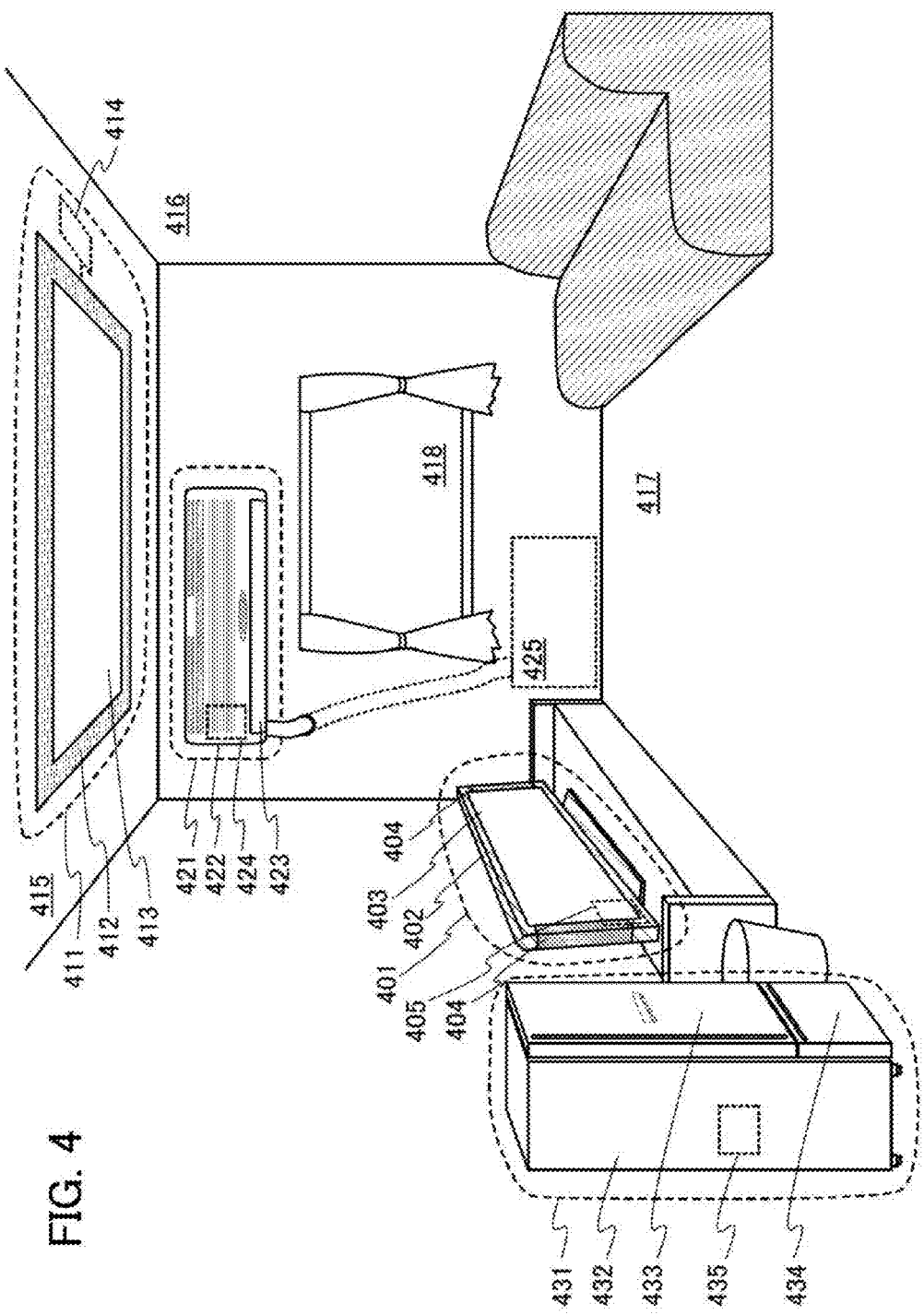
FIG. 4 is a view relating to one embodiment of the present invention.

FIG. 4 illustrates specific structures of the electronic and electric devices. In FIG. 4, a display device 401 is an example of an electronic and electric device including a power storage device 405 according to one embodiment of the present invention. Specifically, the display device 401 corresponds to a display device for TV broadcast reception and includes a housing 402, a display portion 403, speaker portions 404, the power storage device 405, and the like. The power storage device 405 according to one embodiment of the present invention is provided inside the housing 402.

The display device 401 can receive electric power from a commercial power supply. Alternatively, the display device 401 can use electric power stored in the power storage device 405. Thus, the display device 401 can be operated with the use of the power storage device 405 according to one embodiment of the present invention as an uninterruptible power supply even when electric power cannot be supplied from the commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used in the display portion 403.

Note that the display device includes, in its category, all of information display devices for personal computers, advertisement displays, and the like other than TV broadcast reception.

In FIG. 4, an installation lighting device 411 is an example of an electric device including a power storage device 414 according to one embodiment of the present invention. Specifically, the lighting device 411 includes a housing 412, a light source 413, a power storage device 414, and the like. FIG. 4 illustrates the case where the power storage device 414 is provided in a ceiling 415 on which the housing 412 and the light source 413 are installed; alternatively, the power storage device 414 may be provided in the housing 412.

The lighting device 411 can receive electric power from a commercial power supply. Alternatively, the lighting device 411 can use electric power stored in the power storage device 414. Thus, the lighting device 411 can be operated with the use of the power storage device 414 according to one embodiment of the present invention as an uninterruptible power supply even when electric power cannot be supplied from the commercial power supply due to power failure or the like.

Note that although the installation lighting device 411 provided in the ceiling 415 is illustrated in FIG. 4 as an example, the power storage device according to one embodiment of the present invention can be used in an installation lighting device provided in, for example, a wall 416, a floor 417, a window 418, or the like other than the ceiling 415. Alternatively, the power storage device can be used in a tabletop lighting device and the like.

As the light source 413, an artificial light source which emits light artificially by using electric power can be used. Specifically, a discharge lamp such as an incandescent lamp and a fluorescent lamp, and a light-emitting element such as an LED and an organic EL element are given as examples of the artificial light source.

In FIG. 4, an air conditioner including an indoor unit 421 and an outdoor unit 425 is an example of an electric device including a power storage device 424 according to one embodiment of the present invention. Specifically, the indoor unit 421 includes a housing 422, a ventilation duct 423, the power storage device 424, and the like. FIG. 4 illustrates the case where the power storage device 424 is provided in the indoor unit 421; alternatively, the power storage device 424 may be provided in the outdoor unit 425. Further alternatively, the power storage devices 424 may be provided in both the indoor unit 421 and the outdoor unit 425.

The air conditioner can receive electric power from a commercial power supply. Alternatively, the air conditioner can use electric power stored in the power storage device 424. Specifically, in the case where the power storage devices 424 are provided in both the indoor unit 421 and the outdoor unit 425, the air conditioner can be operated with the use of the power storage device 424 according to one embodiment of the present invention as an uninterruptible power supply even when electric power cannot be supplied from the commercial power supply due to power failure or the like.

Note that although the separated air conditioner including the indoor unit and the outdoor unit is illustrated in FIG. 4 as an example, the power storage device according to one embodiment of the present invention can be used in an air conditioner in which functions of an indoor unit and an outdoor unit are integrated in one housing.

In FIG. 4, an electric refrigerator-freezer 431 is an example of an electric device including a power storage device 435 according to one embodiment of the present invention. Specifically, the electric refrigerator-freezer 431 includes a housing 432, a door for a refrigerator 433, a door for a freezer 434, the power storage device 435, and the like. The power storage device 435 is provided in the housing 432 in FIG. 4. The electric refrigerator-freezer 431 can receive electric power from a commercial power supply. Alternatively, the electric refrigerator-freezer 431 can use electric power stored in the power storage device 435. Thus, the electric refrigerator-freezer 431 can be operated with the use of the power storage device 435 according to one embodiment of the present invention as an uninterruptible power supply even when electric power cannot be supplied from the commercial power supply because of power failure or the like.

Note that among the electronic and electric devices described above, a high-frequency heating apparatus such as a microwave and an electric device such as an electric rice cooker require high electric power in a short time. The tripping of a circuit breaker of a commercial power supply in use of electric devices can be prevented by using the power storage device according to one embodiment of the present invention as an auxiliary power supply for supplying electric power which cannot be supplied sufficiently by a commercial power supply.

In addition, in a time period when electronic and electric devices are not used, specifically when the proportion of the amount of electric power which is actually used in the total amount of electric power which can be supplied by a commercial power supply source (such a proportion is referred to as a usage rate of electric power) is low, electric power can be stored in the power storage device, whereby the usage rate of electric power can be reduced in a time period when the electronic and electric devices are used. For example, in the case of the electric refrigerator-freezer 431, electric power can be stored in the power storage device 435 at night when the temperature is low and the door for a refrigerator 433 and the door for a freezer 434 are not opened or closed. Meanwhile, the power storage device 435 is used as an auxiliary power supply in the daytime when the temperature is high and the door for a refrigerator 433 and the door for a freezer 434 are opened and closed; thus, the usage rate of electric power in daytime can be reduced.

Example 1

In this example, a sample in which graphene is formed on a surface of whisker-like silicon by the immersion method described in Embodiment 2 will be described. The whisker-like silicon is formed over a current collector (titanium sheet) by a reduced-pressure CVD method using a silane gas as a source material and has a surface shape illustrated in FIG. 5A.

An aqueous solution in which graphene oxide is dispersed was manufactured as described below. Potassium permanganate was added to a mixture of graphite (flake carbon) and concentrated sulfuric acid, followed by stirring for 2 hours. After that, pure water was added to the mixture, the mixture was stirred for 15 minutes while being heated, and a hydrogen peroxide solution was added thereto, so that a yellow-brown solution containing graphite oxide was obtained. Furthermore, the obtained solution was filtered, hydrochloric acid was added, followed by washing with pure water. After that, ultrasonic treatment was performed for 2 hours, so that the graphite oxide was changed into graphene oxide. In such a manner, an ajueous solution in which graphene oxide was dispersed was obtained.

Figure 5A:
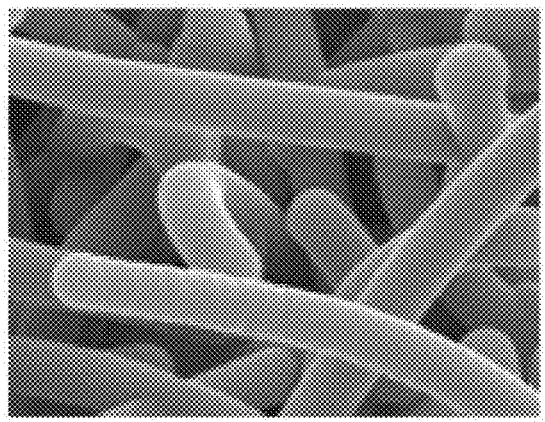
FIGS. 5A to 5C are images showing silicon whiskers and a graphene layer formed on surfaces of the silicon whiskers.
Figure 5B:
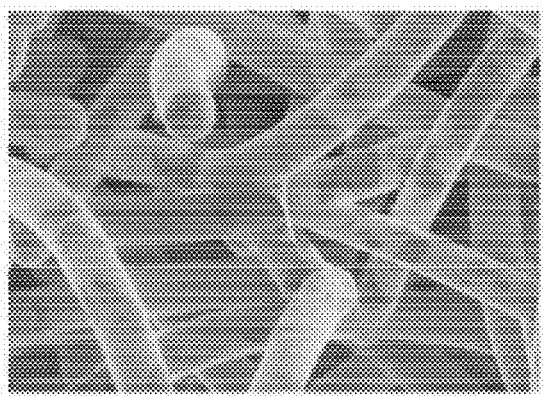
Figure 5C:
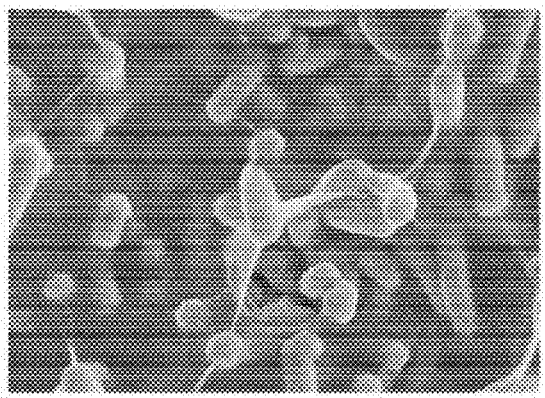

After that, the titanium sheet with the above-described whisker-like silicon was immersed in the aqueous solution, and then taken out of the solution. The titanium sheet with the whisker-like silicon was dried and heated at 300° C. in vacuum (0.1 Pa or lower) for 10 hours. FIG. 5C shows an observed surface of the sample manufactured in this manner.

As shown in FIG. 5C, a depression of the whisker-like silicon is covered with a graphene layer. FIG. 5C also shows that the graphene layer is formed so as to connect projections of the whisker-like silicon.

Figure 6A:
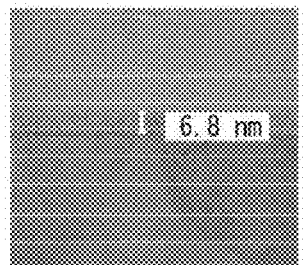
FIGS. 6A to 6C are images relating to Example 1.
Figure 6B:
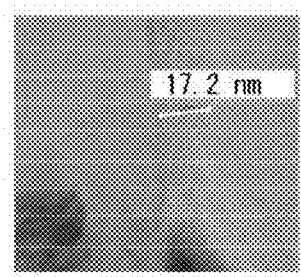

Cross-sectional TEM observation was performed in order to see how thick the graphene covering the whisker-like silicon was. Cross sections of two portions were observed. In a portion shown in FIG. 6A, the thickness of the graphene was 6.8 nm; in a portion shown in FIG. 6B, the thickness of the graphene was 17.2 nm.

In another portion, a graphene layer was not seen, which shows that the thickness of the graphene layer greatly varies even in one sample.

Figure 6C:
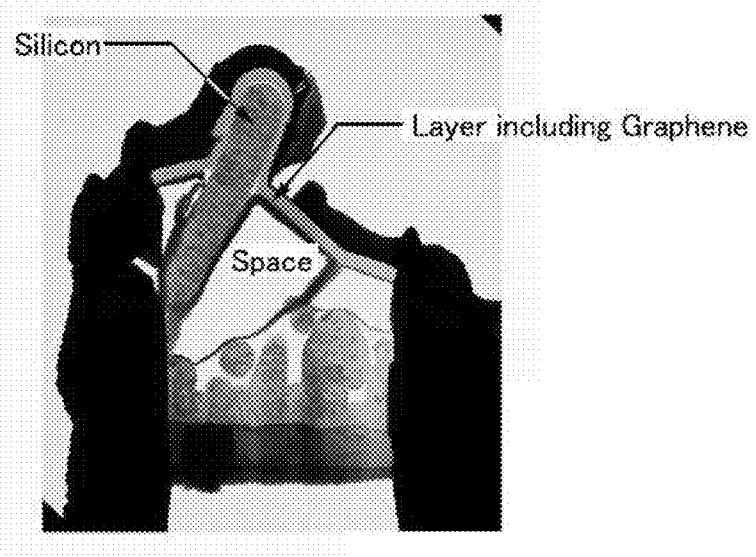

Cross-sectional observation for checking the state of the depressions in FIG. 5C shows that, as shown in FIG. 6C, a space is formed between the graphene layer (layer including graphene) and the depression of the whisker-like silicon. Note that a deposited carbon film was formed over the graphene layer for the sample observation. It needs to be noted that the deposited carbon film is formed over the graphene layer in FIG. 6C.

Example 2

In this example, a sample in which graphene is formed on a surface of whisker-like silicon by the electrophoresis method described in Embodiment 3 will be described. The whisker-like silicon used in this example is the same as that used in Example 1. The graphene oxide aqueous solution prepared in this example is the same as that used in Example 1.

A titanium sheet with the whisker-like silicon was immersed in the aqueous solution in which graphene oxide was dispersed, and a stainless steel plate was immersed therein as a counter electrode. The distance between the titanium sheet and the stainless steel plate was 1 cm. Then, with the titanium sheet used as an anode and the stainless steel plate as a cathode, a voltage of 10 V was applied between the anode and the cathode for 5 minutes. The amount of charge flowing during the 5 minutes was 0.114 C.

After that, the titanium sheet was taken out of the solution, dried, and then heated at 300° C. in vacuum (0.1 Pa or lower) for 10 hours. In such a manner, the sample was manufactured. FIG. 5B shows an observed surface of the obtained whisker-like silicon. Although a noticeable difference from FIG. 5A is not seen, a film-like object connecting whiskers is seen in the central part of the image. In addition, dark portions are seen in places on the surfaces of the whiskers. The dark portions are possibly graphene with a large thickness.

Peaks of a D band and a G band, which are characteristics of graphene, were seen in any portion of the whiskers in measurements by Raman spectroscopy. This shows that substantially the entire surfaces of the whiskers are probably covered with graphene.

As described above, in the electrophoresis method, the thickness of the graphene layer can be controlled with the amount of charge; thus, the electrophoresis method has extremely high reproducibility. As described above, the graphene layer formed by the electrophoresis method described in Embodiment 3 can be extremely uniform.

Example 3

In this example, comparison is made between the case where whisker-like silicon whose surface was provided with graphene was used as a cathode of a lithium-ion secondary battery and the case where whisker-like silicon whose surface was not provided with anything was used as a cathode of a lithium-ion secondary battery. It is known that an electrolyte solution used in the lithium-ion secondary batter is reacted with an electrode (especially cathode), so that a film of a compound decomposed from the electrolyte solution is firmed-on a surface of the electrode.

Such a film of a compound is referred to as a solid electrolyte interface (SEI) and thought necessary for relieving and stabilizing the reaction between an electrode and an electrolyte. However, since the thickness of the SEI depends on the combination of an electrode and an electrolyte, the thickness might be larger than necessary.

As adverse effects caused when the SEI is formed, there are a reduction in coulombic efficiency, a reduction in lithium ion conductivity between an electrode and an electrolyte solution, wasting of an electrolyte solution, and the like. An attempt to cover a surface of an electrode by an evaporation method or a CVD method has been conventionally made in order to suppress the formation of such an SEI.

The surface area of an electrode of a lithium-ion secondary battery is preferably large; therefore, for example, an object having a complex shape such as whisker-like silicon is preferably used. The surface of such an object cannot be covered by an evaporation method or a CVD method. However, the method described in Embodiment 1 or Example 1 makes it possible to adequately cover even whisker-like silicon.

In this example, two kinds of samples, Sample A and Sample B, were prepared. Sample A is whisker-like silicon whose surface was not provided with anything and had an initial state of the surface similar to that of the whisker-like silicon shown in FIG. 5A. Sample B is whisker-like silicon whose surface was provided with graphene by the method described in Example 1 and had an initial state of the surface similar to that of the whisker-like silicon shown in FIG. 5B.

Then, cyclic voltammetry measurement (CV measurement) was performed once on each of Sample A and Sample B to observe the surface of each whisker-like silicon. The CV measurement was performed at a scan rate of 0.1 mV/sec using a three-electrode beaker cell (working electrode: Sample A or Sample B, reference electrode: metallic lithium, counter electrode: metallic lithium, electrolyte solution: mixed solution of ethylene carbonate (EC) solution (1 mol/L) of lithium hexafluorophosphate ($LiPF_6$) and diethyl carbonate (DEC) (1:1 (volume ratio))).

Figure 8A:
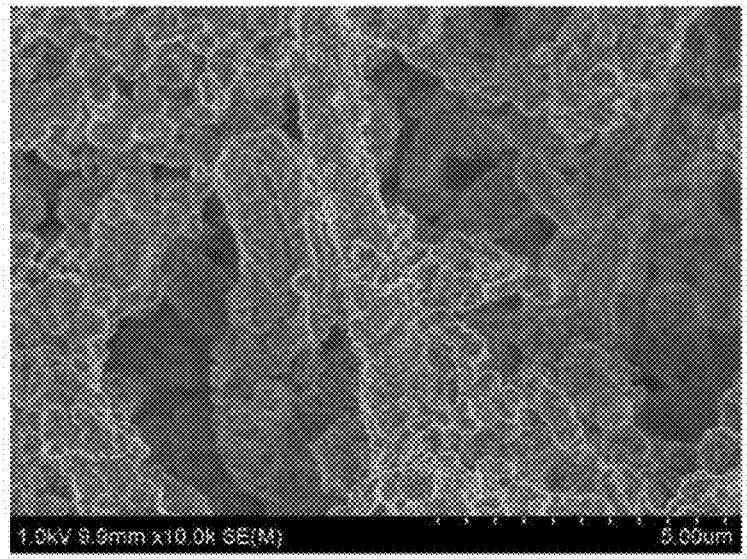
FIGS. 8A and 8B are images relating to Example 3.
Figure 8B:
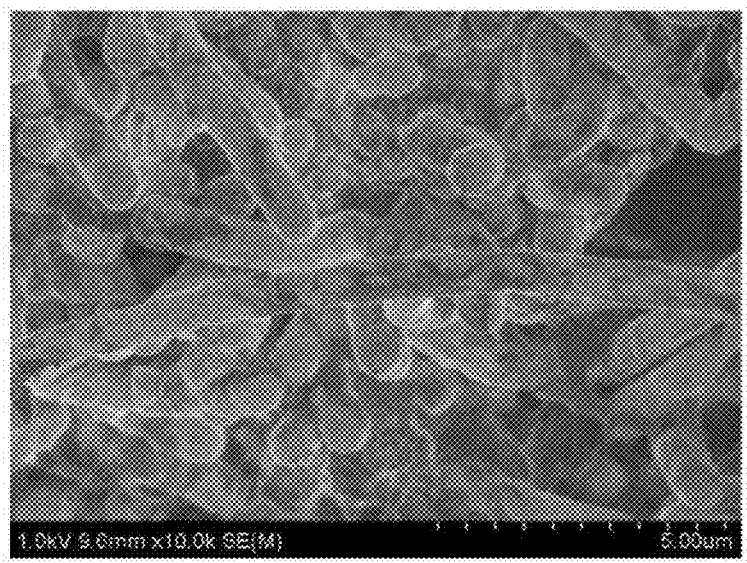

FIG. 8A shows the surface of Sample A after being subjected to one cycle of the above-described CV measurement (scan range: 0 V to 1 V (vs. $Li/Li^+$)). FIG. 8B shows the surface of Sample B after being subjected to ten cycles of the above-described CV measurement (scan range: 0 V to 1 V (vs. $Li/Li^+$)).

As is clear from the comparison between FIG. 8A and FIG. 5A, a thick SEI is formed on the surface of Sample A and it is difficult to see the shape of the original whisker-like silicon. In contrast, as is clear from the comparison between FIG. 8B and FIG. 5B or between FIG. 8B and FIG. 8A, an SEI formed on the surface of Sample B was not as thick as the SEI formed on the surface of Sample A.

A coin cell was manufactured using Sample A or Sample B as an anode, metallic lithium as a cathode, a mixed solution of an ethylene carbonate (EC) solution (1 mol/L) of lithium hexafluorophosphate ($LiPF_6$) and diethyl carbonate (DEC) (1:1 (volume ratio)) as an electrolyte solution, and polypropylene with minute holes as a separator. Then, the coin cell was charged and discharged to measure the amount of change in capacity associated with desorption and absorption of lithium. The amount of current in the charging and discharging was set to 50 µA for the first cycle and 4 mA for the second cycle and the subsequent cycles.

Figure 7A:
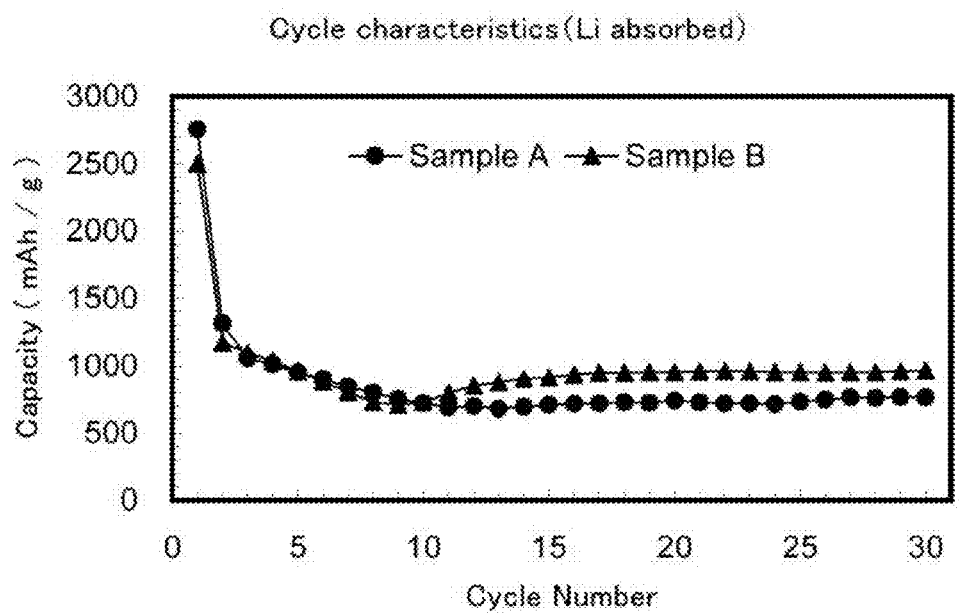
FIGS. 7A and 7B are graphs relating to Example 2.
Figure 7B:
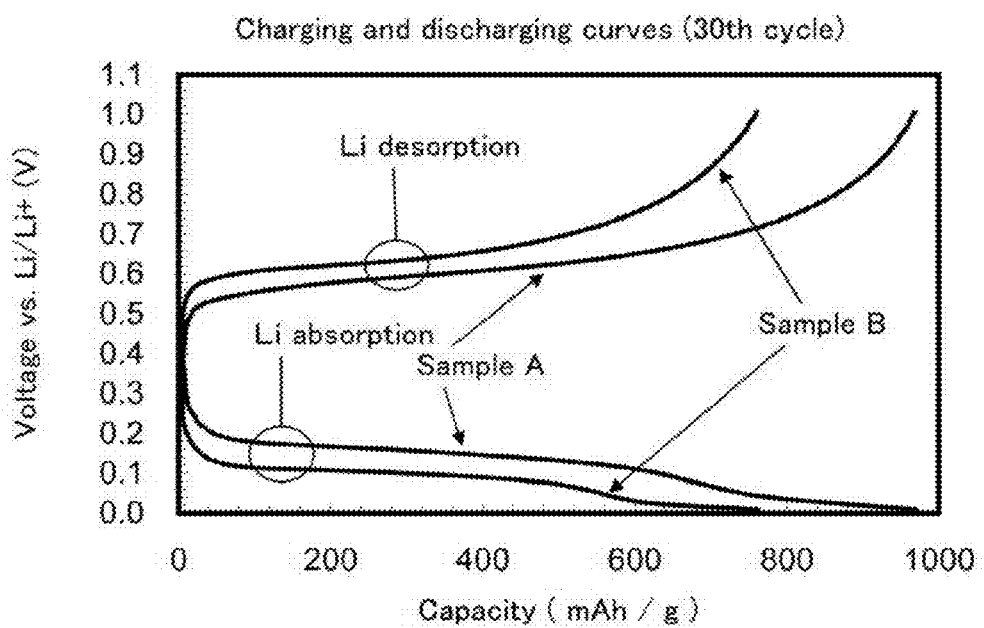

As shown in FIG. 7A, when desorption and absorption of lithium were repeated, the capacity of each of Sample A and Sample B was reduced; however, the capacity of Sample B was increased to be higher than that of Sample A in the tenth cycle and the subsequent cycles. FIG. 7B shows the relation between the capacity and a change in the potential which are associated with the desorption (or absorption) of lithium in the thirtieth cycle. FIG. 7B shows that Sample B can desorb and absorb a larger amount of lithium than Sample A. This is probably because the SEI formed on Sample B was not as thick as the SEI formed on Sample A.

This application is based on Japanese Patent Application serial no. 2011-124952 filed with the Japan Patent Office on Jun. 3, 2011 and Japanese Patent Application serial no. 2011-125057 filed with the Japan Patent Office on Jun. 3, 2011, the entire contents of which are hereby incorporated by reference.

What is claimed is:

1. A battery comprising:
   an active material layer comprising a plurality of whiskers comprising a first whisker and a second whisker; and
   one or a plurality of graphene layers covering the plurality of whiskers, and
   wherein a part of the one or the plurality of graphene layers connects the first whisker to the second whisker.

2. The battery according to claim 1, wherein the active material layer is a negative electrode active material layer.

3. The battery according to claim 1, wherein the one or each of the plurality of graphene layers includes at least one pore.

4. The battery according to claim 1, further comprising a layer comprising a material different from graphene, the layer being provided over the one or the plurality of graphene layers.

5. The battery according to claim 1, wherein each of the plurality of whiskers comprises silicon.

6. The battery according to claim 1, wherein a thickness of the plurality of graphene layers is substantially uniform.

7. An electric device comprising the battery according to claim 1.

8. The battery according to claim 1,
   wherein a depression between the first whisker, the second whisker, and the part of the one or the plurality of graphene layers comprises a space.

9. The battery according to claim 1,
   wherein number of layers of the one or the plurality of graphene layers is 50 or less,
   wherein a direction of the plurality of whiskers is random,
   wherein a concentration of elements other than carbon and hydrogen contained in the one or the plurality of graphene layers is lower than or equal to 15 atomic %, and
   wherein a concentration of oxygen contained in the one or the plurality of graphene layers is higher than or equal to 5 atomic % and lower than or equal to 15 atomic %.

10. An electrode comprising:
    a current collector;
    an active material layer over the current collector, the active material layer comprising:
        a plurality of whiskers comprising silicon the plurality of whiskers comprising a first whisker and a second whisker; and
        one or a plurality of graphene layers covering the plurality of whiskers,
    wherein a part of the one or the plurality of graphene layers connects the first whisker to the second whisker.

11. The electrode according to claim 10, wherein the one or each of the plurality of graphene layers includes at least one pore.

12. The electrode according to claim 10, further comprising a layer comprising a material different from graphene, the layer being provided over the one or the plurality of graphene layers.

13. The electrode according to claim 10, wherein a thickness of the plurality of graphene layers is substantially uniform.

14. An electric device comprising the electrode according to claim 10.

15. The electrode according to claim 10, wherein the one or the plurality of graphene layers is provided over a surface of the current collector and a surface of the plurality of whiskers.

16. The electrode according to claim 10,
    wherein a depression between the first whisker, the second whisker, and the part of the one or the plurality of graphene layers comprises a space.

17. The electrode according to claim 10,
    wherein number of layers of the one or the plurality of graphene layers is 50 or less,
    wherein a direction of the plurality of whiskers is random, wherein a concentration of elements other than carbon and hydrogen contained in the one or the plurality of graphene layers is lower than or equal to 15 atomic %, and wherein a concentration of oxygen contained in the one or the plurality of graphene layers is higher than or equal to 5 atomic % and lower than or equal to 15 atomic %.

18. The battery according to claim 9, wherein the number of layers of the one or the plurality of graphene layers is 20 or less.

19. The electrode according to claim 17, wherein the number of layers of the one or the plurality of graphene layers is 20 or less.

\* \* \* \* \*